Jan. 6, 1942. H. E. SHEARER ET AL 2,268,677
MEANS FOR TESTING THE RESISTANCE OF FABRICS TO SNAGGING
Filed Feb. 17, 1940

Inventors:
Howard E. Shearer and
Edward Max Schenke
By J. F. Mothershead
Attorney Patented Jan. 6, 1942

2,268,677

UNITED STATES PATENT OFFICE 2,268,677

MEANS FOR TESTING THE RESISTANCE OF FABRICS TO SNAGGING

Howard E. Shearer, Washington, D. C., and Edward Max Schenke, Bethesda, Md., assignors to the Secretary of Commerce and to his successors in office, as trustee for the People of the United States of America Application February 17, 1940, Serial No. 319,434

9 Claims. (Cl. 73—51)

(Granted under the act of March 3, 1883, as amended April 30, 1928; 370 O. G. 757)

The invention described herein may be manufactured and used by or for the Government of the United States for governmental purposes without the payment to use of any royalty thereon in accordance with the provisions of the act of April 30, 1928 (Ch. 460, 45 Stat. L. 467).

Our invention relates to an apparatus for testing the resistance of fabrics to snagging, and is particularly adaptable for testing knitted and woven materials, such for example as stockings.

An object of the invention is to provide snagging mechanism which may be passed back and forth over the surfaces of the material, under certain controlled conditions, until the material is snagged and a hole produced therein.

Another object of our invention is to provide means for passing such snagging mechanism over the surface of a fabric in predetermined courses and obtaining a numerical measure of the ease of, and resistance to, snagging.

Figure 1:
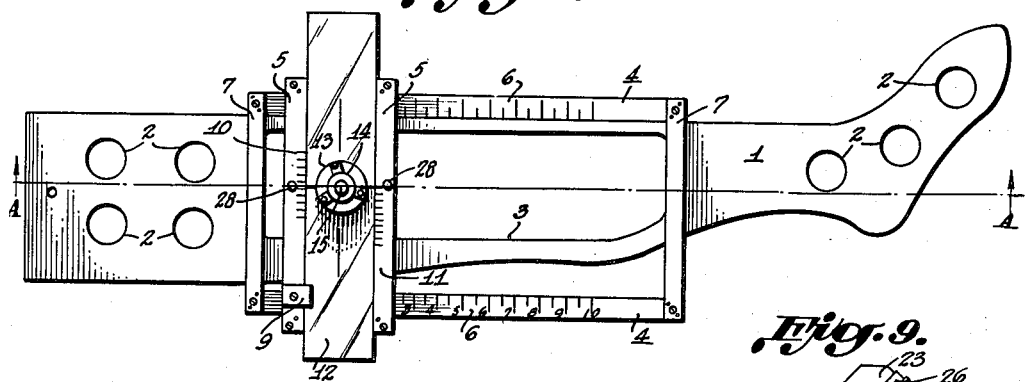
Figure 2:
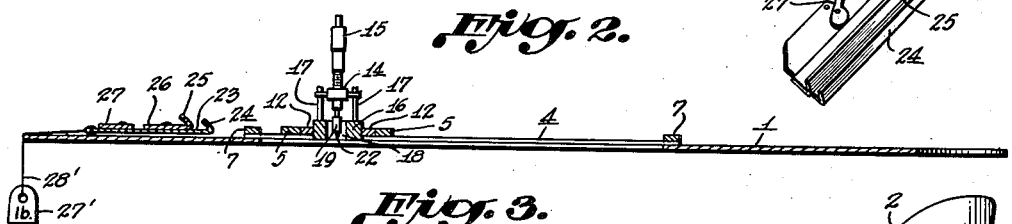
Figure 3:
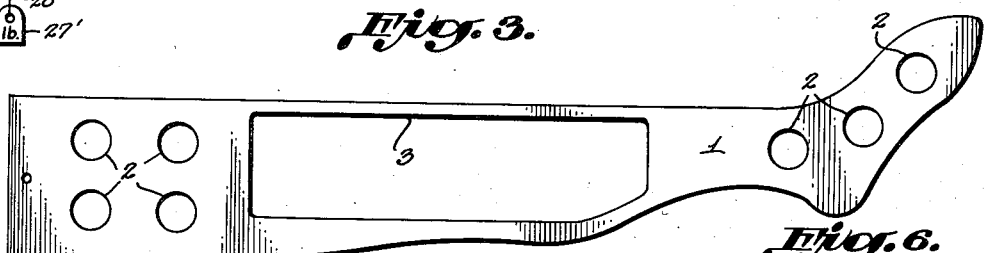
Figures 4, 4A:
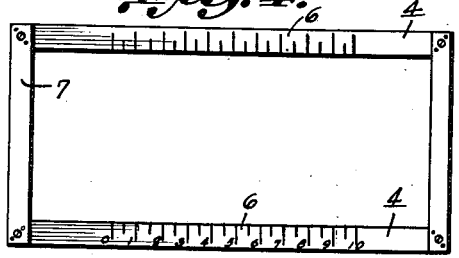
Figures 5, 5A:
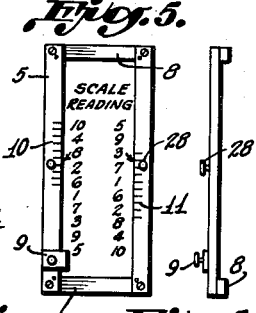
Figures 6, 6A:
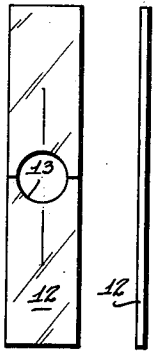
Figures 7, 8:
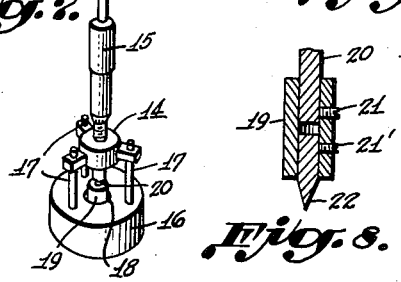

With the foregoing and other objects in view, our invention resides in the method, in the combination of parts, and in the details of construction hereinafter set forth in the following specification and appended claims, certain embodiments thereof having the characteristics of our invention and by which the same may be practiced being illustrated in the accompanying drawing as adapted, by way of example, to testing the relative snagging resistance of stockings, and in which:

Figure 1 is a plan view of the assembled apparatus as it appears in its position for use;

Figure 2, a vertical section of the apparatus on line A—A of Figure 1;

Figure 3, a plan view of the form on which the stocking is placed for testing and over which the snagging mechanism is to be passed;

Figure 4, a plan view of the main frame used for controlling the movement of the snagging mechanism;

Figure 4A, an end view of the frame shown in Figure 4;

Figure 5, a plan view of the sliding carriage, which fits on the main frame shown in Figure 4, for controlling the forward and backward movement of the snagging mechanism;

Figure 5A, an end view of the carriage shown in Figure 5;

Figure 6, a plan view of the cross slide, which fits into the sliding carriage shown in Figure 5, for holding the snagging mechanism and controlling its position crosswise of the stocking;

Figure 6A, an end view of the slide shown in Figure 6;

Figure 7, a detailed view in perspective of the snagging mechanism;

Figure 8, an enlarged mid-section view of the snagger; and

Figure 9:
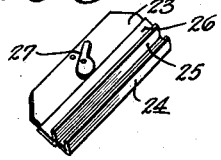

Figure 9, a detailed perspective view of the clamp for securing the upper end of the stocking and holding it taut during the movement of the snagging mechanism.

For use in connection with the testing of hosiery a form, shown in the drawing by way of illustrating the improved snagging device, of standard dimensions, as described by the inventors in the National Bureau of Standards circular C422, "Methods of Testing Hosiery," is preferably used. As shown in the drawing, this form 1 may contain a series of holes 2 for lightening purposes, and a cut-out mid-section 3 into which inserts of suitable material are placed for cushioning the pressure of the point of the snagging device described hereinafter. For inserts it has been found satisfactory to use a piece of 100% rag white chart paper over No. 1 quality binder's board, 0.110 inch thick. Other materials may be used with equal and satisfactory results so long as they possess a slight amount of resiliency or give under the point of the needle without allowing the needle to cut in or penetrate. If the insert is of a quality that will retain the impressions of the needle stroke then a new insert should be used for each test to insure uniform results.

To carry the snagging equipment over the article to be tested a main frame 4 is provided. This frame is preferably of a width sufficient to bridge the form 1 and rest upon the surface of a table or the like upon which the form is placed. The frame should be smoothly finished to prevent snagging and of sufficient height to allow the free movement thereon of a sliding carriage 5 without touching the stocking when on the form 1. The frame 4 is also provided with a scale 6 for marking the lateral position of the snagging mechanism and the location of snags in the stocking. The form bridging members 7 of the frame 4 are sufficiently elevated to clear the stocking when on the form 1 and serve as stops to the longitudinal movement of the carriage 5, i. e., longitudinally of the form.

The sliding carriage 5 fits snugly over the main frame 4 so as to move smoothly thereover, without touching the stocking on the form 1, when lateral force is applied to the carriage. The carriage may be suitably held against movement transversely of the form 1 by such means as guides 8. A cross slide 12, which may be of transparent material to facilitate reading and allow greater vision, is carried by the sliding carriage 5 which is in turn fitted with a clamp 9 for securing the cross slide in predetermined positions during the lateral movement of the carriage. The carriage 5 is also provided with two off-center scales 10—11, such as one quarter inch calibration, so located that when the front or straight edge of form 1 is flush against the frame 4, the No. 1 position of the scale to be used is mid-way between the sides of opening 3 in form 1. The other scale is offset sufficiently to fall into a similar position for use when the form is turned over for a testing of the other side of the stocking.

The cross slide 12 fits snugly into the sliding carriage 5 so as to move freely therein except when secured by clamp 9 at predetermined positions for testing. Centrally located in the cross slide is an opening 13 of sufficient size to allow the insertion of the base plate 16 of the snagging mechanism Figure 7 so as to rest at all times flatly upon the stocking by its own weight. The size of the opening should not be sufficient, however, to allow the plate 16 to be tilted during the snagging or moving operation. In this respect we have also improved upon previous micrometric developments by increasing the thickness of the plate 16 to insure engagement with the side walls of the opening in slide 12 to prevent a tilting of the micrometer. The micrometrically adjustable snagging device has also been improved by reducing the diameter of the base plate 16 in order to allow a greater number of test runs on a small width of material without having the plate project over the edge of the area being tested.

The snagging mechanism (see Figure 7) comprises a micrometer screw 15 secured by suitable means, such as a collar 14 and supporting posts 17, to a base plate 16. Through the center of the base plate 16 is an opening 18 to permit passage of the snagger shank 19 which is secured to the shaft 20 of the micrometer screw by means of a set screw 21. At the lower end of the snagger shank, a needle 22 is replaceably secured by a set screw 21'. By this improvement in previously developed micrometric snagging devices a new point may be used for each test in order to insure uniform testing.

A weighted material clamp is provided for holding the fabric taut during the testing thereof. This clamp (see Figure 9) consists of a flat plate 23 having one end 24 bent upwardly so as to form a lip and recess, over and into which the upper edge of the stocking, for its full width, is passed and secured by means of sliding plate 26 equipped with an upturned end 25 which fits into turned end 24 and is held in place by means of an eccentric lever 27, as shown. To this clamp a weight 27' may be fastened by suitable means, such as a cord 28', which will allow it to hang over the end of the form 1. By this means the stocking is held taut in position flat against the form.

A knob 28 may be provided for the manual movement of the carrier or in lieu thereof suitable mechanical means may be provided for more uniform actuation of the carrier.

In making the test, the material (a stocking shown for illustrative purposes) is placed on the form 1, and the inserts to fit the recess 3 are slipped into position. If it is preferred to use 100% rag white chart paper over binder's board as an insert, the smooth surface of the chart paper should be uppermost. The stocking is straightened on the form so that the seam will fall along the edge of the form. A groove may be provided along the edge of the form for this purpose. The clamp (Figure 9) is then attached by turning the upper edge of the welt back over the lip 24 and securing it in position by means of slide 26 and lever 27. The clamp is positioned with the back of plate 23 flat on the form and a weight attached, as mentioned, to hold the stocking taut. A freely hanging 1 lb. weight, attached by such as a cord to the clamp, has been found ample. The form is then laid on a flat surface, as a table top, in such a manner as to allow the weight to hang over the end of the form as shown in Fig. 2. The assembled frame (Figures 4, 5 and 6) is then placed over the hosiery form in such manner that the straight edge of the form is substantially parallel to and against a side of the main frame 4 with so much of the opening 3 as is possible within the ends 7 of the frame 4.

The sliding assembly is then drawn to the left end position of the main frame 4, and the cross slide 12 adjusted so its center line corresponds with the No. 1 position on a scale of the sliding carriage 5. With the apparatus assembled as shown in Figure 1 with the straight edge of the hosiery form against the back edge of the main frame the left scale 10 would be used. When the form is turned over the straight edge lies against the front edge of the main frome in which position the right scale 11 is used.

The initial setting or zero point of the snagging mechanism Figure 7 is that setting at which the snagging point 22 is flush with the lower surface of the base plate 16. This point may be obtained by setting the snagging mechanism on a flat hard surface, such as plate glass, and slowly lowering the point until contact is made with the surface. With this point obtained the snagging mechanism is inserted in the opening 13 of the cross slide 12 and allowed to rest, with its full weight upon the material to be tested.

With the cross slide 12 adjusted to the No. 1 position of the scale on the sliding carriage, and the snagging point 22 at its initial setting, or zero point, one cycle or movement of the sliding carriage is made the full length of the main frame and return. If there is no indication of snagging the snagging point is lowered 0.002" and the movement repeated. These steps are repeated until there is some evidence of snagging at this position. The cross slide 12 is then shifted to the No. 2 position of the scale on the sliding carriage and the movement again repeated. This operation is continued at successive scale positions until the snagger has produced a hole in the stocking by breaking the yarn. The number and type of snags and holes produced at each setting of the micrometer screw of the snagger is recorded. The form containing the stocking is then turned over and with the insert reversed the operation is repeated. A fresh insert should be used for each stocking, though the base insert may be used for a number of tests so long as its surface shows no impressions from the snagging point.

The results obtained for the two sides of the stocking are averaged for each micrometer setting and are considered as the snag resistance of the stocking. The number and type of snags produced at each setting of the micrometer screw are taken as an indication of the ease of snagging while the production of a hole is taken as an indication of the resistance to destructive snagging. The resistance to destructive snagging is designated by the term "snag index" which is the difference in the setting of the micrometer screw at the initial or zero point and the setting at which a hole first occurs, expressed as a whole number. The ease of snagging and the snag index are both considered in estimating the resistance to snagging.

For simplicity, the snags may be classified as (1) light snags: a mere dislocation or spreading of the stitch; (2) snags: open wide or spread stitches; (3) looped snags: stitches pulled and yarn looped above the surface of the fabric; and (4) holes: yarn broken.

A further simplification of the recorded results may be arrived at by evaluating two light snags as the equivalent of one snag; two snags as the equivalent of one looped snag; and one hole as the equivalent of three looped snags.

By this means only the one type of snag, of the predominant class present, need be reported for each setting of the micrometer screw and, where consistently followed, has been found to give a good indication of the comparative resistance of stockings to snagging in a condensed, informative, and easily understood style. Some variations from this procedure may be found desirable under certain conditions without departing from the spirit of our invention, particularly in the use of the device for testing other types of material.

We claim as our invention:

1. A device for determining the resistance of fabric to snagging, comprising the combination of a base frame, a carrier frame slidable within predetermined limits on said base frame, means for tautly holding a portion of fabric to be tested, a micrometric snagging device adapted to rest upon the portion of fabric to be tested, and a guide adjustably carried by said carrier frame and associated with the snagging device whereby to guide said device over the fabric along predetermined lines upon the movement of the carrier frame upon said base frame.

2. A fabric snag testing device adapted to be moved over fabric to determine its resistance to snagging comprising the combination of a base member having a substantially flat surfaced bottom, a shaft carried by said member, a replaceable needle carried on the end of said shaft, means whereby said shaft may be micrometrically moved from positions where the point of said needle is above the plane of the bottom surface of said base member to positions where said needle point is extended projectingly beneath said plane, and guide means whereby said base member may be uniformly guided over a piece of fabric.

3. A fabric snag testing device adapted to be moved over fabric to determine its resistance to snagging, comprising the combination of a base member having a substantially flat surfaced bottom, a shaft carried by said member, a replaceable needle carried on the end of said shaft, means whereby said shaft may be micrometrically moved from positions where the point of said needle is above the plane of the bottom surface of said base member to positions where said needle point is extended projectingly beneath said plane, and means for guiding said device along predetermined courses over the fabric to be tested.

4. A device for determining the resistance of fabric to snagging, comprising the combination of a support, a prong-like element carried by said support substantially at right angles to the plane of the bottom surface of said support, means for adjusting said prong-like element to raise and lower the point thereof to fixed predetermined positions ranging from immediately above the plane of the bottom surface of said support to positions projectingly beneath said plane, guide means for guiding said support on a plane substantially parallel with the surface of a flatly positioned portion of fabric to be tested, and means for maintaining the bottom surface of said support in substantial parallelism with the surface of the fabric during the movement of said support.

5. A device for determining the resistance of fabric to snagging, comprising the combination of a support, a prong-like element carried by said support substantially at right angles to the plane of the bottom surface of said support, means for adjusting said prong-like element to raise and lower the point thereof to fixed predetermined positions ranging from immediately above the plane of the bottom surface of said support to positions projectingly beneath said plane, and means for guiding said support contactingly over the surface of a flatly positioned portion of the fabric and maintaining its bottom surface in substantially constant parallelism with said fabric.

6. A device for determining the resistance of fabric to snagging, comprising a support having a bottom surface formed for sliding contact with a portion of fabric to be tested, a prong-like element carried by said support substantially normal to said bottom surface, means for adjusting said prong-like element to raise and lower the point thereof to fixed predetermined positions ranging from immediately above said bottom surface to positions beneath said bottom surface, in combination with means movable to produce relative sliding motion between said support and the surface of the fabric, means maintaining said support in position to present said prong-like element substantially normal to the surface of said fabric during said sliding motion, and guide means for maintaining a predetermined line of traverse of said prong-like element across the fabric.

7. A device for determining the resistance of fabric to snagging, comprising a support having a bottom surface formed for sliding contact with a portion of fabric to be tested, a prong-like element carried by said support substantially normal to said bottom surface, means for adjusting said prong-like element to raise and lower the point thereof to fixed predetermined positions ranging from immediately above said bottom surface to positions beneath said bottom surface, in combination with means movable to produce relative sliding motion between said support and the surface of the fabric, means maintaining said support during motion thereof in position to present said prong-like element substantially normal to the surface of said fabric, guide means for maintaining a predetermined line of traverse of said prong-like element across the fabric, and means for holding the fabric to be tested taut during the testing thereof.

8. A device for determining the resistance of fabric to snagging, comprising the combination of a form for stretching a portion of the material to be tested in a substantially uniform plane, a base frame bridging said form, a second frame bridging said base frame and adapted to be moved sidewise of its direction of bridging on said base frame, a support bridging said second frame and adapted to be moved lengthwise of its direction of bridging across the second frame, and an adjustable snagging device having a point projecting below the bottom surface of said support and adapted to contact the material to be tested, said snagging device being associated with said support in a manner to be moved by the sidewise movement of said second frame and lengthwise movement of said support.

9. A device for determining the resistance of fabric to snagging comprising the combination of a form for stretching a portion of the material to be tested in a substantially uniform plane, said form having a slightly resilient replaceable portion, a base frame bridging said form, a second frame bridging said base frame and form and adapted to be moved sidewise of its direction of bridging on said base frame, a support bridging said second frame and adapted to be moved lengthwise of its direction of bridging across the second frame, and an adjustable snagging device having a point projecting below the bottom surface of said support and adapted to contact the material to be tested within the confines of the area of the replaceable portion of said form, said snagging device being associated with said support in a manner to be moved by the sidewise movement of said second frame and lengthwise movement of said support.

HOWARD E. SHEARER.
EDWARD MAX SCHENKE.